(12) United States Patent
Sibel et al.

(10) Patent No.: US 12,095,592 B2
(45) Date of Patent: Sep. 17, 2024

(54) CIRCULAR PILOT SEQUENCES FOR JOINT CHANNEL AND PHASE NOISE ESTIMATION

(71) Applicant: MITSUBISHI ELECTRIC CORPORATION, Tokyo (JP)

(72) Inventors: Jean-Christophe Sibel, Rennes Cedex (FR); Cristina Ciochina, Rennes Cedex (FR); Julien Guillet, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 421 days.

(21) Appl. No.: 17/433,471

(22) PCT Filed: Jan. 31, 2020

(86) PCT No.: PCT/JP2020/004696
§ 371 (c)(1),
(2) Date: Aug. 24, 2021

(87) PCT Pub. No.: WO2020/208921
PCT Pub. Date: Oct. 15, 2020

(65) Prior Publication Data
US 2022/0141053 A1 May 5, 2022

(30) Foreign Application Priority Data
Apr. 8, 2019 (EP) .................... 19305458

(51) Int. Cl.
*H04L 5/00* (2006.01)
*H04L 25/02* (2006.01)
(Continued)

(52) U.S. Cl.
CPC .......... *H04L 25/022* (2013.01); *H04L 5/0048* (2013.01); *H04L 25/0228* (2013.01); *H04L 25/03821* (2013.01)

(58) Field of Classification Search
CPC .............. H04L 25/022; H04L 25/0226; H04L 25/0228; H04L 25/0256; H04L 5/0007;
(Continued)

(56) References Cited

U.S. PATENT DOCUMENTS

| 11,757,680 | B2 * | 9/2023 | Zhang ................... H04L 5/0012 |
| | | | 370/329 |
| 2011/0116485 | A1 * | 5/2011 | Olszewski ............ H04L 5/0007 |
| | | | 370/338 |

(Continued)

FOREIGN PATENT DOCUMENTS

WO    WO 2019/024664 A1    2/2019

OTHER PUBLICATIONS

International Search Report for PCT/JP2020/004696 (PCT/ISA/237) mailed on Jun. 8, 2020.

(Continued)

*Primary Examiner* — Edan Orgad
*Assistant Examiner* — Vanneilian Lalchinthang
(74) *Attorney, Agent, or Firm* — Birch, Stewart, Kolasch & Birch, LLP

(57) ABSTRACT

The invention relates to a method for transmitting at least K reference signals in a radio signal to be transmitted over a wireless communication system, said radio signal being intended to be emitted by an emitter comprising at least a transmit antenna configured for emitting on a number M of subcarriers $S_1, \ldots, S_M$ amongst which at least a number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+K}$ being ordered, said radio signal being provided by: inserting the at least K reference signals $P_1, \ldots, P_K$ so that the at least K reference signals $P_1, \ldots, P_K$ are respectively transmitted on the K contiguous (Continued)

subcarriers $S_{q+1}, S_{q+2}, \ldots, S_{q+K}$; emitting the radio signal including the at least K reference signals.

13 Claims, 5 Drawing Sheets

(51) Int. Cl.
  *H04W 4/00* (2018.01)
  *H04W 72/04* (2023.01)
  *H04L 25/03* (2006.01)
(58) Field of Classification Search
  CPC ............... H04L 1/0083; H04L 27/2602; H04L 25/0258; H04L 25/03821; H04L 5/0048; H04L 5/0092; H04L 27/2613; H04W 72/20; H04W 72/0406; H04W 24/10; H04W 80/08; H04B 7/0452; H04B 1/7143; H04B 1/713
  USPC ........................................ 370/329
  See application file for complete search history.

(56) References Cited

U.S. PATENT DOCUMENTS

| 2017/0005715 | A1* | 1/2017 | Cezanne | H04L 5/0053 |
| 2017/0279579 | A1* | 9/2017 | Qian | H04W 72/20 |
| 2017/0302352 | A1* | 10/2017 | Islam | H04W 72/21 |
| 2018/0167237 | A1* | 6/2018 | Gudovskiy | H04W 24/02 |
| 2018/0212733 | A1* | 7/2018 | Khoryaev | H04L 5/0007 |
| 2020/0153585 | A1* | 5/2020 | Wu | H04L 27/2688 |
| 2020/0213161 | A1* | 7/2020 | Zhang | H04L 5/0048 |
| 2020/0235900 | A1* | 7/2020 | Yang | H04L 5/0094 |

OTHER PUBLICATIONS

Written Opinion of the International Searching Authority for PCT/JP2020/004696 (PCT/ISA/237) mailed on Jun. 8, 2020.
European Communication pursuant to Article 94(3) EPC for European Application No. 19 305 458.2, dated Mar. 13, 2023.

* cited by examiner

CIRCULAR PILOT SEQUENCES FOR JOINT CHANNEL AND PHASE NOISE ESTIMATION

TECHNICAL FIELD

The present invention generally relates to the domain of telecommunication system, and more specifically to wireless communication for example wireless OFDM-based communication.

The present invention more specifically relates to processing the radio signal received according to the distortion and noise induced on the radio signal by the radio channel.

In the LTE standard, the receivers determine a channel estimation based on the reference signals inserted in the signal by the transmitter. Based on the knowledge of the reference signal (RS), the receiver is able to determine a channel estimation matrix, generally noted H. Each coefficient of this matrix corresponds to an attenuation of the signal between one of the antenna of the transmitter and one of the antenna of the receiver. Based on this matrix the terminal estimates the phase noise of the radio channel. Such a matrix enables to process the radio signal received to reduce the effect of the radio channel on the radio signal. The receiver also implements phase tracking algorithms to deduce the phase noise experienced by the radio signal. Generally, these algorithms assume that the phase noise and the channel (approximated by the channel estimated matrix) are not strongly coupled, which gives good results when the phase noise is small and the channel quasi-static.

However, millimeter-Wave systems which operate in millimeter-Wave bands, for which the new radio standard or 5G currently at normalization aims at, are subject to strong and/or fast phase variations due to different causes such as carrier frequency offset, Doppler effects and especially phase noise. These phase variation break the orthogonality property between the subcarriers used for the communication, leading to subcarrier interferences and thus performance loss. These subcarrier interferences (also called inter-carrier interferences (ICI)), if too important, strongly impact the decoding of the signal especially due to the fact that the channel estimation matrix and the phase noise are determined independently from each other. Therefore, the result of the decoding by algorithms that assume that the phase noise and the channel are not strongly coupled is poor.

Therefore, in case phase noise and channel are strongly coupled there is a need of improvement. The present invention aims at improving the situation.

SUMMARY OF INVENTION

To that end, the invention relates to a method for transmitting at least K reference signals in a radio signal to be transmitted over a wireless communication system, said radio signal being intended to be emitted by an emitter comprising at least a transmit antenna configured for emitting on a number M of subcarriers $S_1, \ldots, S_M$ amongst which at least a number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+K}$ being ordered, said radio signal being provided by:
- inserting the at least K reference signals $P_1, \ldots P_K$ so that the at least K reference signals $P_1, \ldots P_K$ are respectively transmitted on the K contiguous subcarriers $S_{q+1}, S_{q+2}, \ldots, S_{q+K}$;
- emitting the radio signal including the at least K reference signals;

wherein, if K is odd, the values in the frequency domain of the reference signals $P_1, \ldots, P_{(K-1)/2}$ are respectively equal to the values of the reference signals $P_{(K+3)/2}, \ldots, P_K$, if K is even, the values in the frequency domain of the reference signals $P_1, \ldots, P_{K/2}$ are respectively equal to the values of the reference signals $P_{K/2+1}, \ldots, P_K$.

In the invention the reference signals are set according to a specific reference signal pattern. According to this specific reference signal pattern, the reference signals are inserted as a block, that is, the reference signals are inserted on contiguous subcarriers of the carrier. In addition, the values taken by these references signals meet a specific condition, which is that if K is odd, the values of the reference signals $P_1, \ldots, P_{(K-1)/2}$ are respectively equal to the values of the reference signals $P_{(K+3)/2}, \ldots, P_K$, if K is even, the values of the reference signals $P_1, \ldots, P_{K/2}$ are respectively equal to the values of the reference signals $P_{K/2+1}, \ldots, P_K$.

This enables to reduce the complexity of the computation of the phase noise and channel estimation at the receiver side, especially when the channel and phase noise are strongly affected by each other, that is, for example when the radio signal suffers from strong phase noise. Indeed, when strong phase noise affects the radio signal, the attenuation of the radio signal, represented by the channel, can be affected if the phase noise is not taken into account in its estimation (since symbols emitted through other subcarriers may add power to the considered subcarrier, thus obstructing a correct determination of the attenuation of radio signal relatively to this considered subcarrier). Therefore, the invention reduces the effects related to strongly coupled phase noise and channel.

For this aim, the invention implements a block of cyclic structured reference signals. This structure enables to receive, at the receiver side, symbols expressed as circular convolution of the phase noise and the reference signals.

More specifically, at the receiver side, the specific reference signal pattern, due to the block configuration of the reference signals and especially to the size of this block (compared to the spectral occupancy of the phase noise ΔPN as it will be described in the followings), enables to receive a block of $K_0$ (with $$K_0 = \frac{K+1}{2}$$

if K is odd and $$K_0 = \frac{K}{2}$$

if K is even) contiguous symbols $Y_{n_{min}}, \ldots, Y_{n_{max}}$ for which these symbols are only composed of samples of the reference signals of the block of K reference signals. These received symbols may also contain samples from other symbols but these samples are of low energy compared to the samples of the reference signals set in block.

Due to the RS repetition structure inside the block of RS, the invention enables to approximate the received contiguous symbols $(Y_{n_{min}}, \ldots, Y_{n_{max}})$ as a circular convolution of the phase noise $(\psi_{k_{min}}, \ldots, \psi_{k_{max}})$ and the sequence of reference signals $(P_1, \ldots, P_{K_0})$. The components $\psi_i$ of the phase noise are considered as null or negligible under $k_{min}$ and above $k_{max}$, $k_{min}$ to $k_{max}$ corresponds to the spectral occupancy of the phase noise. For example, $(Y_{n_{min}}, \ldots, Y_{n_{max}})$ may be approximated by:

$[Y_{n_{min}}, \ldots, Y_{n_{max}}] = H[\psi_{k_{min}}, \ldots, \psi_{k_{max}}] \circledast [P_1, \ldots, P_{K_0}] + [Z_{n_{min}}, \ldots, Z_{n_{max}}]$ with $(Z_{n_{min}}, \ldots, Z_{n_{max}})$ representing additive white Gaussian noise (AWGN), $\circledast$ being the circular convolution operator and H the channel (the channel being assumed constant over the block).

Such approximation of the received contiguous symbols $(Y_{n_{min}}, \ldots, Y_{n_{max}})$, enabled by the specific reference signal pattern, strongly reduces the computation at the receiver side, since it reduces the computation to $K_0$ linear equations that can theoretically be solved since each equation has at the most $K_0$ unknown values which are the $K_0$ phase noise symbols to determine, without the need of assuming that the channel is not impacted by the phase noise which often leads to poor estimation of the channel and phase noise.

The computation is all the more simplified since the IDFT (invers discrete Fourier transform) of a circular convolution of A per B $F^{-1}(A \circledast B)$ is simply transformed into the Hadamard product of the IDFT of A per the IDFT of B $(F^{-1}A \odot F^{-1}B)$. For example, $$F_{K_0}^{-1}\{(Y_{n_{min}}, \ldots, Y_{n_{max}})\} =$$
$$H. F_{K_0}^{-1}\{(\psi_{k_{min}}, \ldots, \psi_{k_{max}})\} \odot F_{K_0}^{-1}\{(P_1, \ldots, P_{K_0})\} +$$
$$F_{K_0}^{-1}\{(Z_{n_{min}}, \ldots, Z_{n_{max}})\}$$

Therefore, a channel estimation and phase noise estimation can both be deduced from the linear estimation of $F_{K_0}^{-1}\{(Y_{n_{min}}, \ldots, Y_{n_{max}})\}$ by $F_{K_0}^{-1}\{(P_1, \ldots, P_{K_0})\}$ as it will be seen below $$\left( \text{for example, } F_{K_0}^{-1}\{(Y_{n_{min}}, \ldots, Y_{n_{max}})\} \odot \frac{1}{F_{K_0}^{-1}\{(P_1, \ldots, P_{K_0})\}} \right).$$

Other technics will also be described below.

Therefore, the invention enables to efficiently estimate the channel and of the phase noise even in the case of important phase noise, due to the combination of the fact that the radio signal emitted is at the receiver side known at least for a range of frequency and to the fact that the sequence of reference signals transmitted is repeated.

By reference signals the invention encompasses all symbols that are known by the receiver regarding their values and their positions (in time and in frequency), and on the basis of which the receiver can estimate the impact of the radio channel between the transmitter and the receiver. For example, based on the received version of the reference signals (e.g. corrupted by the radio channel that is corrupted by channel and/or noise and/or phase noise, etc.), the receiver can estimate the channel and/or improve the channel estimation quality. Note that the radio channel encompasses here all effects including propagation and hardware impact such as nonlinearities, attenuations, phase noise, Doppler, carrier frequency offset, etc.

The wireless communication system may be a wireless communication system using OFDM (Orthogonal frequency-division multiplexing) like for LTE.

The symbols transmitted in the other subcarriers $S_1, \ldots, S_q, S_{q+K+1}, \ldots, S_M$ may be of any type, that is, other reference signals and/or symbols containing user data and/or symbols containing control data.

By contiguous subcarriers, it is here understood that no other subcarrier may be used to transmit symbols between two contiguous subcarriers. Contiguous symbols are symbols transmitted on contiguous subcarriers.

By inserting the reference signals in the radio signal it is understood setting the values (values which are known by the receiver) in the frequency domain of the symbols to be transmitted through the subcarriers $S_{q+1}, S_{q+2}, \ldots, S_{q+K}$ as it is usually done to insert the reference signals in the radio signal. However, it is also possible to insert the reference signals in the time domain, for example after the IDFT (invers discrete Fourier transform) by adding to the signal outputted by the IDFT a signal corresponding to the reference signals so that the resulting signal is identical or at least similar to the signal that would have been obtained at the output of the IDFT if the reference signals were inserted in the frequency domain. However, for the sake of explanation the invention is described according to a frequency domain insertion of the reference signals.

The K reference signals are inserted to be transmitted together on the K contiguous subcarriers. That is, when the reference signals are inserted in the frequency domain, the symbols which values have been set according to the invention (that is, the symbols transmitted through the subcarriers $S_{q+1}, S_{q+2}, \ldots, S_{q+K}$) are processed together. For example, an IDFT is applied simultaneously to the M subcarriers $S_1, \ldots, S_M$, and thus simultaneously to the K reference signal $P_1, \ldots P_K$ transmitted by the K contiguous subcarriers $S_{q+1}, S_{q+2}, \ldots, S_{q+K}$. More generally, the $P_1, \ldots, P_K$ are inserted to be transmitted by the K contiguous subcarriers $S_{q+1}, S_{q+2}, \ldots, S_{q+K}$ in the same symbol of the transmission scheme, for example, in the same OFDM symbol.

q is an integer greater than or equal to zero and smaller than or equal to M-K.

According to an aspect of the invention, the values of $P_1, \ldots, P_{K_0}$ are respectively a sequence $Q_1, \ldots, Q_{K_0}$ such that $$\frac{1}{K_0} \sum_{k=1}^{K_0} Q_k \overline{Q_{\langle k-J+1 \rangle_{K_0}}}$$

is equal to a non-null predetermined value if j is equal to 1 and equal to zero otherwise, with $\langle n \rangle_L$ being $1+\text{mod}(n-1, L)$, with $\text{mod}(n-1, L)$ being $[n-1] \mod L$.

In this case, the sequence $Q_1, \ldots, Q_{K_0}$ and therefore $P_1, \ldots, P_{K_0}$ satisfy an autocorrelation condition. Using such sequences enables to reduce the effects related to strongly coupled phase noise and channel. Indeed, it enables to isolate each frequency component of the phase noise with an advantageous signal-to-noise ratio, for example by computing $Y_i$.

$$\overline{Q_{\langle i \rangle_{K_0}}}.$$

Therefore, since these reference signals satisfy to this autocorrelation condition it enables to reduce or avoid inter subcarriers interferences.

For example, the autocorrelation condition of sequence $(P_1, \ldots, P_{K_0})$ enables to apply on $Y_{n_{min}}, \ldots, Y_{n_{max}}$ Hadamard products of cyclic permuted sequences $(P_1, \ldots, P_{K_0})$ (as described below), enabling to reduce the complexity of the phase noise and channel estimation.

The sequence $Q_1, \ldots, Q_{K_0}$ may be issued from a CAZAC sequence or advantageously a Zadoff-Chu sequence.

According to an aspect of the invention at least K+K' reference signals are transmitted on the M subcarriers $S_1, \ldots, S_M$ amongst which at least a number K' of different subcarriers $S_{q'+1}, S_{q'+2}, \ldots, S_{q'+K'}$ are contiguous, the respective frequencies of the contiguous subcarriers $S_{q'+1}, S_{q'+2}, \ldots, S_{q'+K'}$ being ordered and q' strictly superior than q+K, said radio signal being further provided by:

inserting the at least K' reference signals $P'_1, \ldots P'_{K'}$ so that the at least K' reference signals $P'_1, \ldots, P'_{K'}$ are respectively transmitted on the K' contiguous subcarriers $S_{q'+1}, S_{q'+2}, \ldots, S_{q'+K'}$;

emitting the radio signal including the at least K+K' reference signals;

wherein, if K' is odd, the values in the frequency domain of the reference signals $P'_1, \ldots, P'_{(K'-1)/2}$ are respectively equal to the values of the reference signals $P'_{(K'+3)/2}, \ldots, P_{K'}$, if K' is even, the values in the frequency domain of the reference signals $P'_1, \ldots, P'_{K'/2}$ are respectively equal to the values of the reference signals $P'_{K'/2+1}, \ldots, P'_{K'}$.

By inserting several groups of reference signals, here two groups of respectively K and K' reference signals are inserted, spaced by a certain frequency represented by q'+1−q+K, it enables a better phase noise estimation by averaging over all local phase noise estimates and it enables a tracking of the channel all along the band (thereafter, groups and blocks of reference signals are synonymous and refer to contiguous reference signals as described by the invention).

More than two groups of reference signals may be inserted according to the invention. Therefore, L groups of respectively $K^1, \ldots, K^L$ reference signals may be inserted in the radio signal according to the invention, these groups being respectively inserted as blocks on the subcarriers $q^i+1, \ldots, q^i+K^i$, with i from 1 to L and with $q^{i+1}+1$ strictly superior than $q^i+K^i$.

Advantageously, the groups may be spaced by one or more subcarriers, enabling to transmit other symbols than reference signals between two groups of reference signals and therefore being able to decode these symbols even though they suffered from important channel and phase noise effects.

The L groups may be of the same size and with the same sequence of reference signals, therefore, reducing the memory needed to store the reference signal pattern.

The transmitter may choose optimized value of the reference signal pattern parameters $(q_i, \mu_i, K^i, Q^i_1, \ldots, Q^i_{K_0^i})$ with i from 1 to L and $\mu_0$, with $$K_0^i = \frac{K^i + 1}{2}$$

if $K^i$ is odd and $$K_0^i = \frac{K^i}{2}$$

if $K^i$ is even and with $\mu_i = q_{i+1} + 1 - q_i + K^i$ representing the number of subcarriers between two blocks of reference signals inserted according to the invention, and $\mu_0$ being the number of subcarriers between the first subcarrier of the carrier used for the transmission and the first subcarrier of the first block of reference signals. As explained above these parameters may be simplified, for example by using the same number of reference signals per block and/or the same values in the sequences $Q^i_1, \ldots, Q^i_{K_0^i}$ and/or having the same number of subcarriers between two blocks of reference signals of the RS pattern. For example, the reference signal pattern parameters can be reduced to $\{Q_1, \ldots, Q_{K_0}\} \cup \{\mu_0\} \cup_{i=1}^{L} \{(\mu_i, K^i)\}$.

The transmitter may set a $$\mu_{max} = \max_i \mu_i$$

lower than the bandwidth coherence of the radio channel, to enable an accurate tracking of the radio channel to obtain a good estimation of the phase noise and of the channel on all the bandwidth used for the transmission.

The number of reference signals in each block may be set between a maximum $K^{max}$ and a minimum $K^{min}$, that is, $K^{min} \leq K^i \leq K^{max}$.

$K^{min}$ may be set according to the spectral occupancy of the phase noise $\Delta PN$, that is, such as $K^{min}.\Delta f$ is greater or equal to $2.\Delta PN$, with $\Delta f$ being the subcarrier spacing configuration of at least the subcarriers transmitting the reference signals of the L groups of reference signals. This enables to ensure that the circular convolution of the phase noise with the reference signals takes into account all the components of the phase noise that are not negligible.

$K^{max}$ may be set such as the channel is constant or can be assimilated as such on scale of $K^{max}.\Delta f$. Therefore, the results are better if the channel is constant at least on a scale of $2.\Delta PN$. This enables to have a better approximation with the circular convolution of the symbol received.

A second aspect of the invention concerns a method for processing at a receiver a radio signal transmitted over a wireless communication system and received from an emitter comprising at least a transmit antenna configured for emitting on a number M of different subcarriers $S_1, \ldots, S_M$ amongst which at least a number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+K}$ being ordered, said radio signal including K reference signals, said radio signal being provided according to the method for transmitting the reference signals as described previously, the method comprising:

determining a channel estimation, said channel estimation being dependent on a phase noise estimation;

process the radio signal using the channel estimation determined.

By determining a channel estimation dependent on a phase noise estimation it is understood that the channel estimation is function of the phase noise estimation.

Put another way, the phase noise estimation and the channel estimation are both determined based on a same group of parameters $(\Lambda_1, \ldots, \Lambda_M)$. That is, the channel estimation is computed based on the $M_0$-th parameter $\Lambda_{M_0}$ (with $$M_0 = \frac{M}{2} + 1$$

if M is an even integer and $$M_0 = \frac{M+1}{2}$$

if M is an odd integer) and the phase noise estimation is based on M parameters ($\Lambda_1, \ldots, \Lambda_M$) for which $K_0$ components are non-null and centered around the $M_0$-th parameter $\Lambda_{M_0}$, that is, starting from the $k_{min}$-th ($k_{min}=M_0-\frac{1}{2}.(K_0-1)$ if $K_0$ is odd and $k_{min}=M_0-K_0/2$ if $K_0$ is even as it will be seen below) parameter $$\Lambda_{\frac{M}{2}+1-1/2.(K_0-1)}$$

to the $$k_{max}\text{-th}\left(k_{max} = \frac{M}{2} + 1 + 1/2.(K_0 - 1)\right)$$

if $K_0$ is odd and $$k_{max} = \frac{M}{2} + 1/2.K_0$$

if $K_0$ is even as it will be seen below) parameter $$\Lambda_{\frac{M}{2}+1+1/2.(K_0-1)}.$$

Therefore, determining a channel estimation, said channel estimation being dependent on a phase noise estimation is equivalent to determining a channel estimation and/or a phase noise estimation, said channel estimation and said phase noise estimation being determined based on a same parameter.

This parameter ($\Lambda_{M_0}$) used according to the invention to determine the channel estimation and/or the phase noise estimation can be obtained either by a linear estimation based on $F_{K_0}^{-1}\{(P_1, \ldots, P_{K_0})\}$ and $F_{K_0}^{-1}\{(Y_{n_{min}}, \ldots, Y_{n_{max}})\}$ or by $$\frac{1}{K_0}\sum_{n=n_{min}}^{n_{max}} Y_n.\overline{Q_{(n-q+2-M_0)_{K_0}}}.$$

Put another way, the channel estimation and/or the phase noise estimation are computed considering the circular convolution of the phase noise with the reference signals as an approximation of received symbols on specific subcarriers as previously described.

This enables to compute the phase noise estimation by considering the channel and compute the channel estimation by considering the phase noise, therefore, when the radio signal suffers strong phase noise the channel estimation is not erroneously made without taking into account the phase noise. For example, computing channel estimation by estimating the attenuation of the signal on a subcarrier per subcarrier basis only.

According to an aspect of the invention the determination of the channel estimation comprises:

determining symbols $Y_{n_{min}}, \ldots, Y_{n_{max}}$, said symbols $Y_{n_{min}}, \ldots, Y_{n_{max}}$ in the frequency domain being respectively received on subcarriers $S_{n_{min}}, \ldots, S_{n_{max}}$, with:

if $K/2$ is an even integer then $n_{min} =$ $$q + \frac{K-4}{4} \text{ and } n_{max} = q + \frac{1}{4}(3K - 8),$$

if $K/2$ is an odd integer then $n_{min} =$ $$q + \frac{K-6}{4} \text{ and } n_{max} = q + \frac{1}{4}(3K - 10),$$

if $(K+1)/2$ is an even integer then $n_{min} =$ $$q + \frac{K-3}{4} \text{ and } n_{max} = q + \frac{1}{4}(3K - 5),$$

if $(K+1)/2$ is an odd integer then $n_{min} =$ $$q + \frac{K-5}{4} \text{ and } n_{max} = q + \frac{1}{4}(3K - 7);$$

computing the channel estimation, said channel estimation being obtained through a, with $F_{K_0}^{-1}\{U\}$ being the inverse DFT of order $K_0$ of the vector U of size $K_0$, with $$K_0 = \frac{K+1}{2}$$

if K is an odd integer and $$K_0 = \frac{K}{2}$$

if K is an even integer.

First the receiver obtains the symbols in the frequency domain of the received radio signal corresponding to the radio signal emitted according to the method for transmitting the reference signals as described previously. That is, for example, these symbols are obtained from applying a DFT (discrete Fourier transform) on the received radio signal. The received symbols which contain combination of the reference signals with only negligible power related to emitted symbols that are not RS from the pattern specified by the invention are selected. These selected symbols are for example $Y_{n_{min}}, \ldots, Y_{n_{max}}$, that is, the symbols received on the subcarrier $S_{n_{min}}, \ldots, S_{n_{max}}$, with $n_{min}$ and $n_{max}$ as defined above. From these symbols, the channel estimation can be computed through a linear estimation based on $F_{K_0}^{-1}\{(P_1, \ldots, P_{K_0})\}$ and $F_{K_0}^{-1}\{(Y_{n_{min}}, \ldots, Y_{n_{max}})\}$. Indeed, based on the fact that $(Y_{n_{min}}, \ldots, Y_{n_{max}})=H.(\psi_{k_{min}}, \ldots, \psi_{k_{max}})\circledast(P_1, \ldots, P_{K_0})+(Z_{n_{min}}, \ldots, Z_{n_{max}})$ with $(\psi_{k_{min}}, \ldots, \psi_{k_{max}})$ the substantial component of the phase noise, H the value of the channel (the channel being assumed constant over the block of K reference signals) and $(Z_{n_{min}}, \ldots, Z_{n_{max}})$ the additive noise, the linear estimation based on $F_{K_0}^{-1}\{(P_1, \ldots, P_{K_0})\}$ and $F_{K_0}^{-1}\{(Y_{n_{min}}, \ldots, Y_{n_{max}})\}$ enables to have a good estimate $(F_{K_0}^{-1}\{(\Lambda_{k_{min}}, \ldots, \Lambda_{k_{max}})\})$ of $F_{K_0}^{-1}\{H(\psi_{k_{min}}, \ldots, \psi_{k_{max}})\}$. Linear estimation based on $F_{K_0}^{-1}\{(P_1, \ldots, P_{K_0})\}$ and $F_{K_0}^{-1}\{(Y_{n_{min}}, \ldots, Y_{n_{max}})\}$ is for example a Zero Forcing-like equalization or MMSE estimation. MMSE estimation is $\hat{H}.F_{K_0}^{-1}\{(\widehat{\psi_{k_{min}}}, \ldots, \widehat{\psi_{k_{max}}})\}=(F_{K_0}^{-1}\{(P_1, \ldots, P_{K_0})\}^{\dagger} F_{K_0}^{-1}\{(P_1, \ldots, P_{K_0})\}+V)^{-1}F_{K_0}^{-1}\{(P_1, \ldots, P_{K_0})\}^{\dagger}F_{K_0}^{-1}\{(Y_{n_{min}}, \ldots, Y_{n_{max}})\}$ with V the covariance matrix of size $K_0$ of vector $F_{K_0}^{-1}\{(Z_{n_{min}}, \ldots, Z_{n_{max}})\}$ and † is the conjugate transpose operator. Based on the estimate $(\Lambda_{k_{min}}, \ldots, \Lambda_{k_{max}})$ a good channel estimation and phase noise estimation can be deduced as previously described.

The radio channel, also known as equivalent channel in the literature, encompasses here all phenomena impacting the radio signal, from the output of OFDM modulation at the emitter to the input of the OFDM demodulation at the receiver, including propagation and hardware impact such as nonlinearities, attenuations, phase noise, Doppler, carrier frequency offset, etc.

The channel, for which is done a channel estimation, is the radio channel for which the phase noise is not included.

Therefore, the radio channel encompasses the attenuation represented by the channel and the effects of the phase noise.

According to an aspect of the invention the determination of the channel estimation further comprises:

computing a frequency domain representation $\hat{H}$ of the channel estimation, such as $\hat{H}$ is computed based on $$F_{K_0,M_0}\{(\lambda_1, \ldots, \lambda_{K_0})\}$$

where $(\lambda_1, \ldots, \lambda_{K_0})$ is the result of the linear estimation based on $F_{K_0}^{-1}\{(P_1, \ldots, P_{K_0})\}$ and $F_{K_0}^{-1}\{(Y_{n_{min}}, \ldots, Y_{n_{max}})\}$ and $F_{K_0,j}\{u\}$ is the j-th terme of DFT of order $K_0$ of the vector u of size $K_0$ and with $$M_0 = \frac{M}{2} + 1$$

if M is an even integer and $$M_0 = \frac{M+1}{2}$$

if M is an odd integer.

That is, as previously explained $\Lambda_{M_0} = F_{K_0,M_0}\{\lambda_1, \ldots, \lambda_{K_0}\}$.

According to an aspect of the invention, the invention further comprises:

computing a frequency domain representation $\hat{\psi}$ of the phase noise estimation, $\hat{\psi} = (\hat{\psi}_1, \ldots, \hat{\psi}_M)$, such that $$\hat{\psi}_{(j-M_*)_M}, M_* = \frac{M}{2}$$

if M is an even integer and $$M_* = \frac{M-1}{2}$$

if M is an odd integer, is computed based on $$F_{K_0,j}\{(\lambda_1, \ldots, \lambda_{K_0})\}$$

where $(\lambda_1, \ldots, \lambda_{K_0})$ is the result of the linear estimation based on $F_{K_0}^{-1}\{(P_1, \ldots, P_{K_0})\}$ and $F_{K_0}^{-1}\{(Y_{n_{min}}, \ldots, Y_{n_{max}})\}$ and $F_{K_0,j}\{u\}$ is the j-th terme of DFT of order $K_0$ of the vector u of size $K_0$.

More specifically and as previously explained the phase noise estimation, or more specifically each component $\hat{\psi}_j$ of the frequency domain representation $\hat{\psi} = (\hat{\psi}_1, \ldots, \hat{\psi}_M)$ of the phase noise estimation is based on $\Lambda_j$, with $\Lambda_j = F_{K_0,j}\{(\lambda_1, \ldots, \lambda_{K_0})\}$ for j from $k_{min}$ to $k_{max}$ and $\Lambda_j$ equal to zero otherwise.

Therefore, according to the invention the channel estimation and the phase noise estimation are both based on the same group of parameters $(\Lambda_1, \ldots, \Lambda_M)$, therefore, strong phase noise variations are considered for the phase noise estimation as well as for the channel estimation.

According to an aspect of the invention the channel estimation comprises:

determining symbols $Y_{n_{min}}, \ldots, Y_{n_{max}}$, said symbols $Y_{n_{min}}, \ldots, Y_{n_{max}}$ in the frequency domain being respectively received on subcarriers $S_{n_{min}}, \ldots, S_{n_{max}}$, with:

if K/2 is an even integer then $$n_{min} = q + \frac{K-4}{4} \text{ and } n_{max} = q + \frac{1}{4}(3K - 8),$$

if K/2 is an odd integer then $$n_{min} = q + \frac{K-6}{4}$$

and $$n_{max} = q + \frac{1}{4}(3K - 10),$$

if (K+1)/2 is an even integer then $$n_{min} = q + \frac{K-3}{4}$$

and $$n_{max} = q + \frac{1}{4}(3K - 5),$$

if (K+1)/2 an odd integer then $$n_{min} = q + \frac{K-5}{4}$$

and $$n_{max} = q + M_0 + \frac{1}{4}(3K - 7);$$

computing a frequency domain representation $\hat{H}$ of the channel estimation, such as $\hat{H}$ is computed based on $$\frac{1}{K_0} \sum_{n=n_{min}}^{n_{max}} Y_n \cdot \overline{Q_{(n-q+2-M_0)_{K_0}}}$$

with $$K_0 = \frac{K+1}{2}$$

if K is an odd integer and $$K_0 = \frac{K}{2}$$

if K is an even integer and with $$M_0 = \frac{M}{2} + 1$$

if M is an even integer and $$M_0 = \frac{M+1}{2}$$

if M is an odd integer;
processing the radio signal using the channel estimation computed.

Like previously described, the receiver first obtains the symbols in the frequency domain of the received radio signal corresponding to the radio signal emitted according to the method for transmitting the reference signals as described previously. That is, for example, these symbols are obtained from applying a DFT (discrete Fourier transform) on the received radio signal. The received symbols which contain combination of the reference signals with only negligible power related to emitted symbols that are not RS from the pattern specified by the invention are selected. These selected symbols are for example $Y_{n_{min}}, \ldots, Y_{n_{max}}$, that is, the symbols received on the subcarrier $S_{n_{min}}, \ldots, S_{n_{max}}$, with $n_{min}$ and $n_{max}$ as defined above. In the case where the reference signals $P_1, \ldots, P_K$ are issued, as previously described, from a sequence $Q_1, \ldots, Q_{K_0}$ which satisfies an auto-correlation condition, that is, $$\frac{1}{K_0}\sum_{k=1}^{K_0} Q_k \overline{Q_{\langle k-J+1 \rangle_{K_0}}}$$

is equal to a predetermined value if j is equal to 1 and equal to zero otherwise, the group of parameters $(\Lambda_1, \ldots, \Lambda_M)$ may be set such as each $\Lambda_j$ is computed based on $$\frac{1}{K_0}\sum_{n=n_{min}}^{n_{max}} Y_n \cdot \overline{Q_{\langle n-q+2-J \rangle_{K_0}}}$$

for j from $k_{min}$ to $k_{max}$ and $\Lambda_j$ equal to zero otherwise and a good channel estimation can be deduced from this group of parameters as previously described. Regarding the phase noise estimation, or more specifically each component $\hat{\psi}_j$ of the frequency domain representation $\hat{\psi}=(\hat{\psi}_1, \ldots, \hat{\psi}_M)$ of the phase noise estimation, $$\hat{\psi}_{\langle j-M_* \rangle_M}$$

is computed based on $$\frac{1}{K_0}\sum_{n=n_{min}}^{n_{max}} Y_n \cdot \overline{Q_{\langle n-q+2-j \rangle_{K_0}}}$$

for $k_{min} \leq j \leq k_{max}$ and null otherwise. As specified hereafter: computing a frequency domain representation $\hat{\psi}$ of the phase noise estimation, $\hat{\psi}=(\hat{\psi}_1, \ldots, \hat{\psi}_M)$ such that $$\hat{\psi}_{\langle j-M_* \rangle_M},$$

$$M_* = \frac{M}{2}$$

if M is an even integer and $$M_* = \frac{M-1}{2}$$

if M is an odd integer, is computed, for $k_{min} \leq j \leq k_{max}$, based on:

$$\frac{1}{K_0}\sum_{n=n_{min}}^{n_{max}} Y_n \cdot \overline{Q_{\langle n-q+2-j \rangle_{K_0}}}$$

with $$k_{min} = M_0 - \frac{K-4}{4}$$

and $$k_{max} = M_0 + \frac{K}{4}$$

if K is an even integer and K/2 is an even integer, $$k_{min} = M_0 - \frac{K-2}{4}$$

and $$k_{max} = M_0 + \frac{K-2}{4}$$

if K is an even integer and K/2 is an odd integer, $$k_{min} = M_0 - \frac{K-3}{4}$$

and $$k_{max} = M_0 + \frac{K+1}{4}$$

if K is an odd integer and K/2 is an even integer, $$k_{min} = M_0 - \frac{K-1}{4}$$

and $$k_{max} = M_0 + \frac{K-1}{4}$$

if K is an odd integer and K/2 is an odd integer, and
processing the radio signal using the phase noise estimation $\hat{\psi}$ computed.

By processing the radio signal using the channel estimation and/or the phase noise estimation determined it is understood that the receiver can, due to these estimation, reduce the effects on the radio signal of the radio channel (that is of the channel and of the phase noise). Therefore, the receiver can decode correctly the radio signal to retrieve the symbols emitted by the transmitter.

For example, processing the radio signal by the receiver may comprise computing estimated symbols $\hat{X}_1, \ldots, \hat{X}_M$ of symbols $X_1, \ldots, X_M$ respectively transmitted on the subcarriers $S_1, \ldots, S_M$, said estimated symbols ($\hat{X}_1, \ldots, \hat{X}_M$) being obtained by linear equalization based on $\hat{H}$ of R, R being a DFT of order M of $e^{-i\hat{\varphi}} \odot y$ with $e^{-i\hat{\varphi}}$ equal to $$\left( \frac{F_{M,1}^{-1}\{\hat{\psi}\}}{|F_{M,1}^{-1}\{\hat{\psi}\}|}, \ldots, \frac{F_{M,M}^{-1}\{\hat{\psi}\}}{|F_{M,M}^{-1}\{\hat{\psi}\}|} \right),$$

with $F_{M,m}^{-1}\{U\}$ all being the m-th terme of the inverse DFT of order M of U and with y being the time domain signal received by the receiver.

This enables to have a good estimation of the symbols transmitted through the radio signal when the radio signal suffers from strong phase noise variation. The symbols $X_1, \ldots, X_M$ transmitted on the subcarriers $S_1, \ldots, S_M$ are emitted by the emitter.

A third aspect of the invention concerns a computer program product comprising code instructions to perform the method as described previously when said instructions are run by a processor.

A fourth aspect of the invention concerns an emitter for transmitting at least K reference signals in a radio signal to be transmitted over a wireless communication system, said radio signal being intended to be emitted by the emitter, said emitter comprising:

at least a transmit antenna configured for emitting on a number M of subcarriers $S_1, \ldots, S_M$ amongst which at least a number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+K}$ being ordered, a processor; and a non-transitory computer-readable medium comprising instructions stored thereon, which when executed by the processor configure the emitter to:

insert the at least K reference signals $P_1, \ldots, P_K$ so that the at least K reference signals $P_1, \ldots, P_K$ are respectively transmitted on the K contiguous subcarriers $S_{q+1}, S_{q+2}, \ldots, S_{q+K}$;

emit the radio signal including the at least K' reference signals;

wherein, if K is odd, the values in the frequency domain of the reference signals $P_1, \ldots, P_{(K-1)/2}$ are respectively equal to the values of the reference signals $P_{(K+3)/2}, \ldots, P_K$, if K is even, the values in the frequency domain of the reference signals $P_1, \ldots, P_{K/2}$ are respectively equal to the values of the reference signals $P_{K/2+1}, \ldots, P_K$.

A fifth aspect of the invention concerns a receiver for processing a radio signal transmitted over a wireless communication system and received from an emitter comprising at least a transmit antenna configured for emitting on a number M of different subcarriers $S_1, \ldots, S_M$ amongst which at least a number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+K}$ being ordered, said radio signal including K reference signals, said radio signal being provided according to any one of claims 1 to 4, said receiver comprising:

at least one receiving antenna;

a processor; and a non-transitory computer-readable medium comprising instructions stored thereon, which when executed by the processor configure the receiver to:

determine a channel estimation, said channel estimation being dependent on a phase noise estimation;

process the radio signal using the channel estimation determined.

BRIEF DESCRIPTION OF DRAWINGS

The present invention is illustrated by way of example, and not by way of limitations, in the figures of the accompanying drawings, in which like reference numerals refer to similar elements and in which.

DESCRIPTION OF EMBODIMENTS

Figure 1:
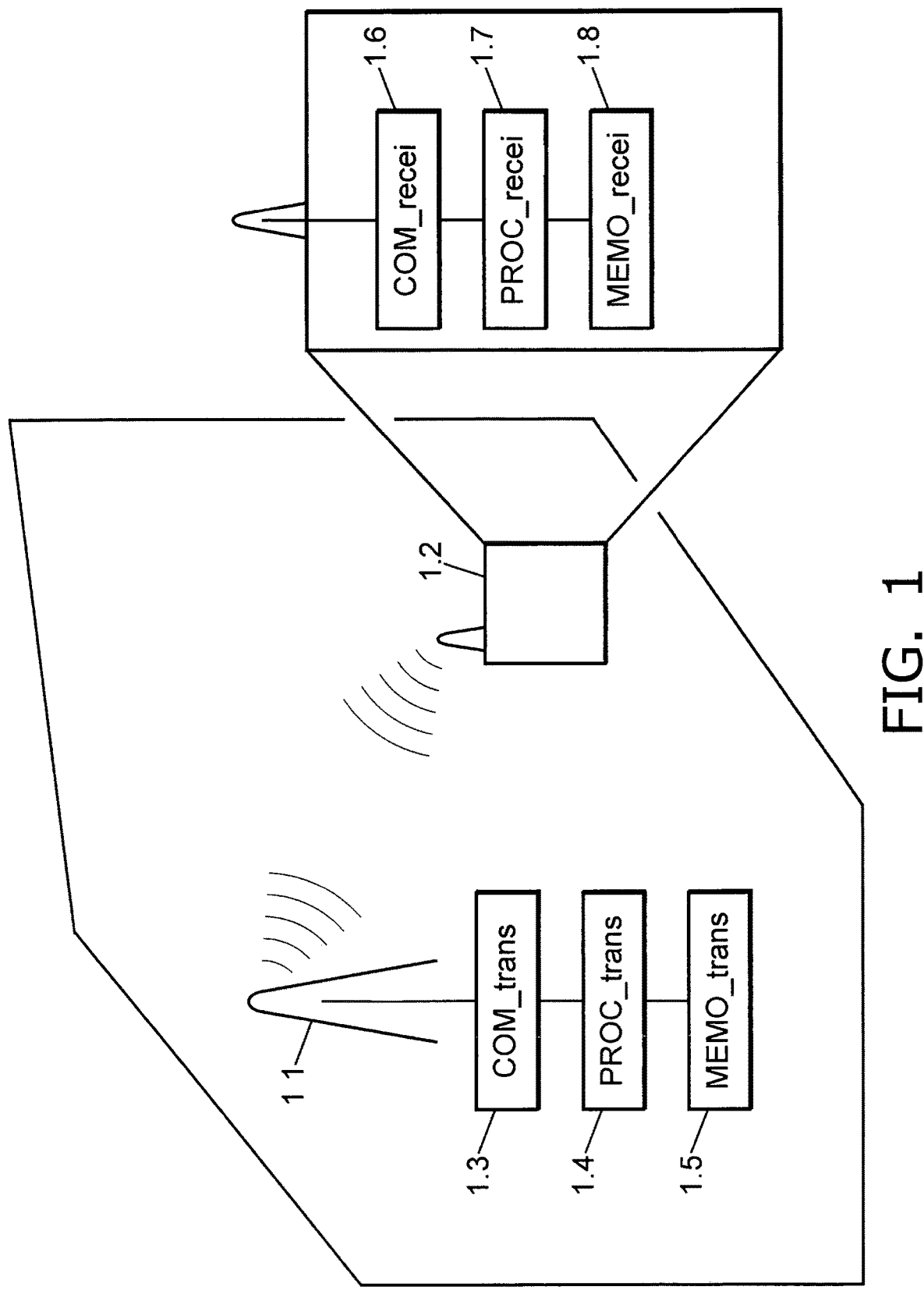
FIG. 1 illustrates a transmitter and receiver according to the invention.

Referring to FIG. 1, there is shown a transmitter 1.1 transmitting a radio signal to a receiver 1.2. The receiver 1.2 is in the cell of the transmitter 1.1. This transmission may be an OFDM based transmission. In this example the transmitter 1.1 is a fixed station and the receiver 1.2 is a mobile terminal. In the context of LTE the fixed station and the mobile terminal are respectively referred to as a base station and a user equipment. The transmitter 1.1 can as well be the mobile terminal and the receiver 1.2 the fixed station.

The transmitter 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and a volatile unit which retrieves the reference signal pattern parameters, for example the tuple $(q_i, \mu_i, K^i, Q^i_1, \ldots, Q^i_{K_0})$. The PROC_trans 1.4 is configured to insert the reference signals according to the invention. The COM_trans is configured to transmit to the receiver 1.2 the radio signal. The processing module 1.4 and the memory unit 1.5 may constitute the device for inserting the reference signals, as previously described. The processing module 1.4 and the memory unit 1.5 can be dedicated to this task or also used for other functions of the transmitter like for processing the radio signal.

The receiver 1.2 comprises one communication module (COM_recei) 1.6, one processing module (PROC_recei) 1.7 and a memory unit (MEMO_recei) 1.8. The MEMO_recei 1.8 comprises a non-volatile unit which retrieves the computer program and a volatile unit which retrieves the reference signal pattern parameters, for example the tuple $(q_i, \mu_i, K^i, Q^i_1, \ldots, Q^i_{K_0})$. The PROC_recei 1.7 is configured to determine a channel estimation and a phase noise estimation and to process the radio signal according to the estimations to retrieve the other symbols emitted by the transmitter 1.1. The COM_recei 1.6 is configured to receive from the transmitter the radio signal. The processing module 1.7 and the memory unit 1.8 may be dedicated to these tasks, as previously described. The processing module 1.7 and the memory unit 1.8 may also be used for other functions of the receiver.

Figure 2:
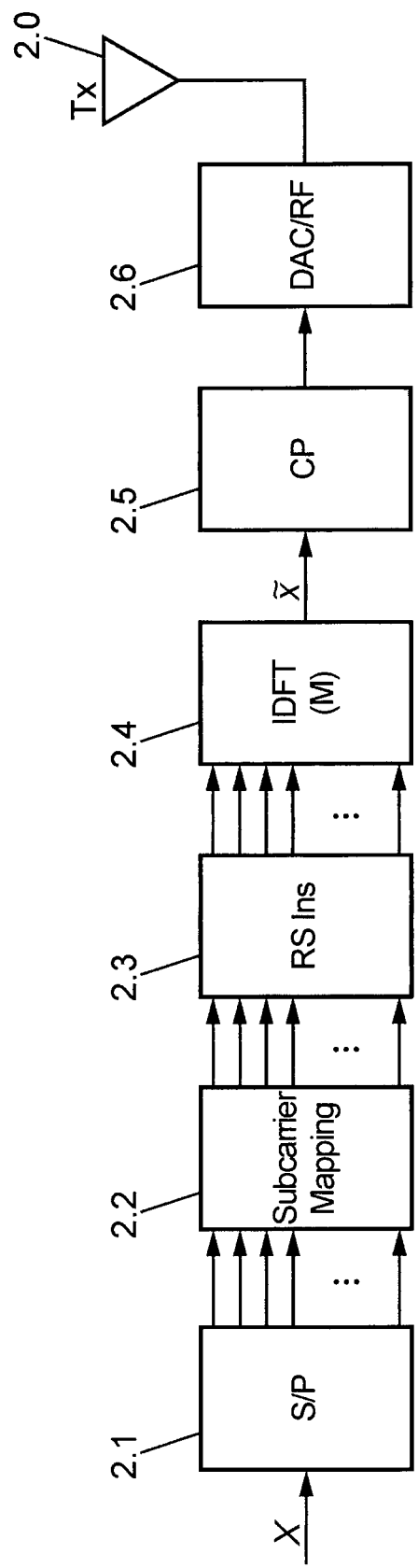
FIG. 2 schematizes a block diagram of a transmitter according to the invention.

Referring to FIG. 2, there is shown a block diagram of a transmitter 1.1 according to the invention. Such OFDM transmitter 1.1 applies an OFDM scheme on a block of N' symbols to obtain the radio signal. In the example of FIG. 2 the OFDM transmitter emits a radio signal by emitting on one transmit antenna Tx 2.0, this is none limiting and the OFDM transmitter can as well transmit by using several transmit antennas, for example in a MIMO context. However, in the context where several antennas are used the reference signal pattern may be identical for each antenna or only one antenna transmits the RS according to the invention, the RS of the RS pattern being replaced by zeros for the other antennas.

To provide the radio signal a serial to parallel (S/P) module 2.1 is applied to the block of N' symbols X'=(X'$_1$, ... X'$_{N'}$). The symbols of the block of symbols may be N' complex symbols obtained by a QPSK digital modulation scheme or any other digital modulation scheme as QAM, or may be symbols of a sequence with controlled PAPR (e.g. a CAZAC sequence).

At the output of the S/P module 2.1, the parallel symbols are mapped, with a subcarrier mapping module 2.2 in the frequency domain to N (>N') out of M subcarriers (S$_1$, ... S$_M$). Regarding the subcarrier mapping, the complex symbols are mapped to the N allocated subcarriers out of M existing subcarriers via subcarrier mapping module 2.2. The subcarrier mapping can be for example localized, that is, the N' complex symbols are mapped throughout N consecutive subcarriers among the M existing. This subcarrier mapping is done in accordance with the reference signal pattern used by the transmitter 1.1. Therefore, the N-N' allocated subcarriers to which none of the N' complex symbols have been mapped correspond to the subcarriers which transmit the RS according to the RS pattern. Therefore, the RS insertion module 2.3 adds to these unused N-N' subcarriers the RS according to the RS pattern as described in FIG. 3. The subcarrier mapping module 2.2 is therefore, parametrized to map the N' symbols on other subcarriers than the N-N' subcarriers intended to be used to transmit the reference signal according to the RS pattern of the invention. That is, for example to let unused the subcarriers $\cup_{i=1}^{L}\{S_{qi+1}, \ldots, S_{qi+K^i}\}$.

M-size inverse DFT module 2.4 is then applied to the resulting vector of M symbols X$_1$, ..., X$_M$, the M symbols being the N non-null symbols (comprising the RS of the RS pattern) and M-N null symbols (according to the subcarrier mapping scheme), therefore generating an OFDM symbol which is transmitted via the transmit antenna 2.0. More precisely, at the output of the IDFT module 2.4 a signal x̃ is obtained. This signal occupies during a time interval corresponding to an OFDM symbol, N allocated subcarriers out of the M existing subcarriers. This time-domains signal x̃ corresponds to an OFDM symbol.

A cyclic prefix can be optionally appended after the IDFT by the CP module 2.5. In addition, the digital-to-analog converter (DAC) module 2.6 converts the digital signal resulting from the IDFT module 2.4 to an analog signal that can be transmitted through the antenna 2.0.

Figure 3:
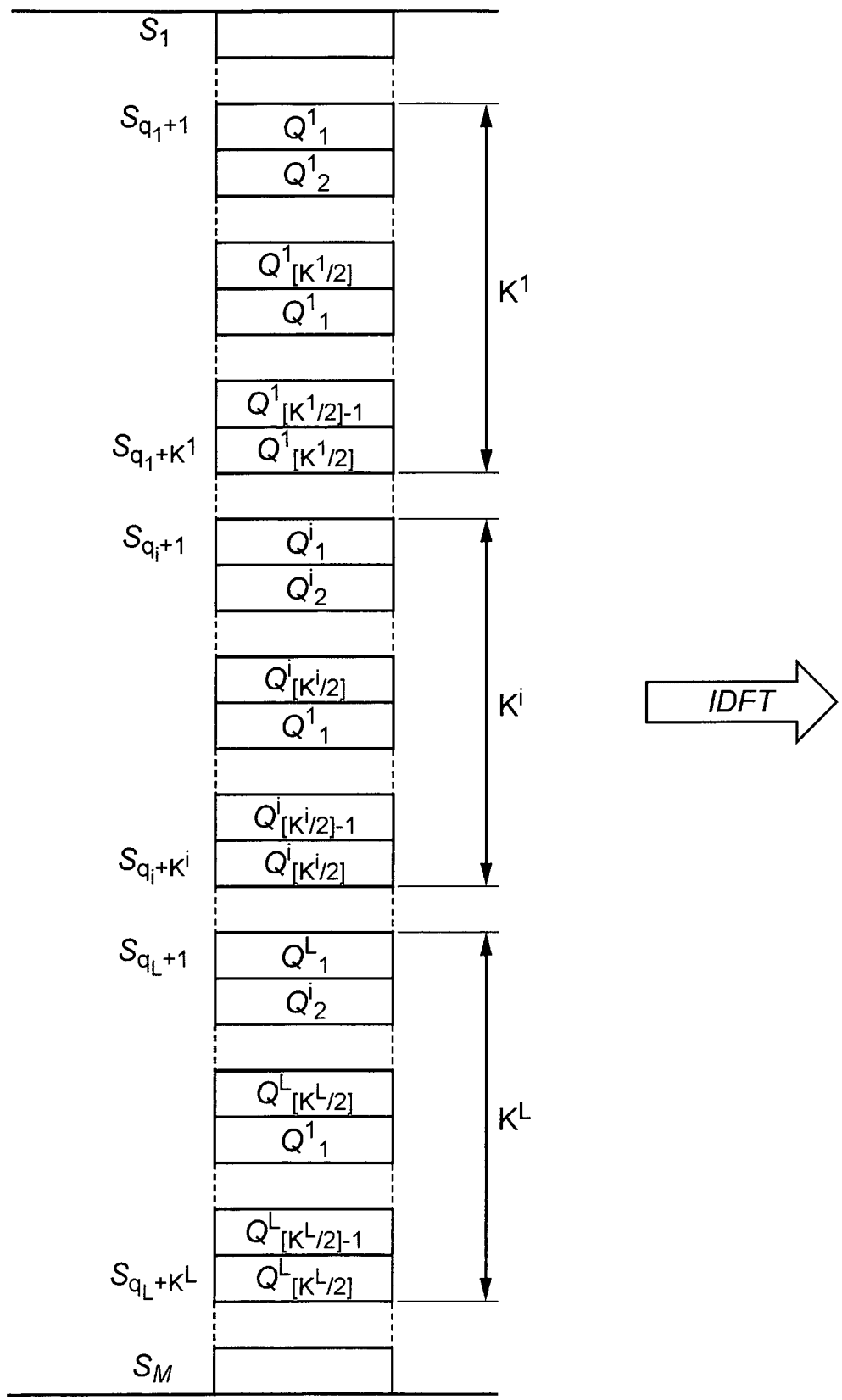
FIG. 3 details an example of a reference signal pattern according to the invention.

Referring to FIG. 3, there is shown an example of a reference signal pattern according to the invention.

The invention specifies specific positions (that is the subcarriers used to transmit the reference signals) and values for the reference signals. This specific reference signal pattern according to the invention (or simply the reference signal pattern) enables to have specific properties of the radio signal enabling to reduce errors during its decoding. However, this does not limit the use of the other subcarriers, that is, the N' subcarriers can be used to transmit any types of symbols, for example other reference signals like DM-RS or PTRS, symbols transmitting control data or user data.

An example of a RS pattern specified by the invention is described at FIG. 3, the reference signals are positioned by groups of RS. On FIG. 3, L groups of RS are configured. The i-th group of RS is transmitted on the subcarriers S$_{qi+1}$, ..., S$_{qi+K^i}$, for i from 1 to L. The position of the first symbol in the group has to be greater than the last position of the previous group, that is, $q_i+K^i<q_{i+1}+1$ for i from 1 to L−1. These positions are among the M positions of the subcarriers used in the bandwidth by the transmitter. Only one group of RS may be set in the RS pattern, then, the group of RS is transmitted on the subcarriers S$_{q+1}$, ..., S$_{q+K}$.

For the i-th group, the values in the frequency domain of the reference signals P$^i_1$, ..., P$^i_{K_0^i-1}$ (transmitted respectively on the subcarriers S$_{qi+1}$, ..., S$_{qi+K_0^i-1}$) are respectively equal to the values of the reference signals P$^i_{K_0^i+1}$, ..., P$^i_{K^i}$ (transmitted respectively on the subcarriers S$_{qi+K_0^i+1}$, ..., S$_{K^i}$), with $$K_0^i = \frac{K^i+1}{2}$$

if K$^i$ is an odd integer and $$K_0^i = \frac{K^i}{2}$$

if K$^i$ is an even integer.

In addition, the group of reference signals P$^i_1$, ..., P$^i_{K^i}$ may be issued from a sequence of Q$^i_1$, ..., Q$^i_{K_0^i}$ which satisfies an auto-correlation condition, that is, such as $$\frac{1}{K_0^i}\sum_{k=1}^{K_0^i} Q_k^i \overline{Q_{(k-J+1)_{K_0^i}}^i}$$

equal to a non-null predetermined value if j is equal to 1 and equal to zero otherwise. Only some of the groups of RS may be issued from such sequences.

These sequences may be CAZAC sequences, for example Zadoff-Chu sequences.

The size K$^i$ of each group of reference signals may be chosen such as described after according to the spectral occupancy of the phase noise, or at least to the spectral occupancy of the modelized phase noise. The size K$^i$ of each group may be set such as the channel is constant or can be assimilated as such on a scale of K$^i$.Δf. Therefore, the results are better if the channel is constant at least on a scale of 2.ΔPN.

The number L of groups of reference signals may be chosen according to the variation of channel in the spectrum. Indeed, if the channel is sensitive to frequency then it may be relevant to have an important density of groups of reference signals through the bandwidth used for the communication. Adventurously these groups of reference signals may be uniformly distributed through the bandwidth (all the μ$_i$ are equal or similar). If the channel is not sensitive to frequency then only one or two groups of reference signals may be needed to have good channel and/or phase noise estimation through all the bandwidth.

Figure 4:
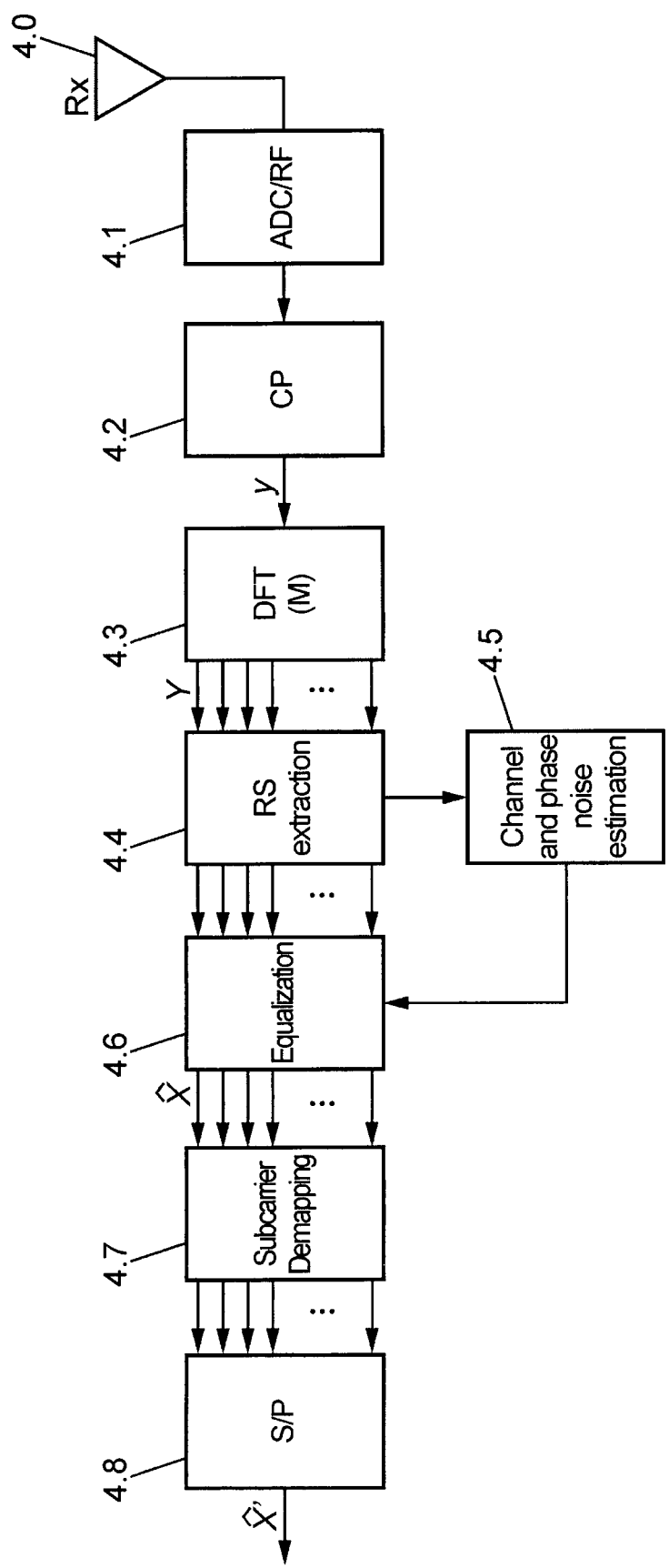
FIG. 4 schematizes a block diagram of a receiver according to the invention.

Referring to FIG. 4, there is shown a block diagram of a receiver 1.2 according to the invention. Such a receiver is configured to decode a radio signal emitted by a transmitter 1.1 as previously described. This example shows a receiver with a unique receive antenna but such receiver can have several receive antennas. When using several antennas, the radio signal received by each antenna differs which introduces receive diversity. In this example said radio signal is received on one antenna Rx 4.0. After applying a analogto-digital converter ADC module 4.1 to the received radio signal and after an optional guard removal (by the CP module 4.2) the resulting signal y is inputted into a M-size DFT 4.3. The results, at the outputs of the DFT 4.3 are M symbols $Y_1, \ldots, Y_M$ respectively received on the subcarriers $S_1, \ldots, S_M$.

The RS extraction module 4.4 extracts a block of symbols from the M symbols $Y_1, \ldots, Y_M$. More specifically, the RS extraction module 4.4 extracts $K_0^i$ received contiguous symbols $Y_{n_{min}^i}, \ldots, Y_{n_{max}^i}$ on the subcarriers $S_{n_{min}^i}, \ldots, S_{n_{max}^i}$. $n_{min}^i$ and $n_{max}^i$ are defined so that each of these extracted symbols are only composed of samples of the reference signals $P^i_1, \ldots, P^i_{K^i}$ of the block of $K^i$ reference signals. These received symbols $Y_{n_{min}^i}, \ldots, Y_{n_{max}^i}$ may also contain samples from other symbols but these samples are of low energy compared to the samples of the reference signals set in block. Indeed, by considering a typical model of phase noise such as a Wiener processed phase noise (also known as a Brownian motion) it is possible to determine the number of contiguous symbols $Y_{n_{min}^i}, \ldots, Y_{n_{max}^i}$ that do not contain samples of other symbols. In addition, advantageously the sizes $K^i$ of the blocks of reference signals are chosen according to the spectral occupancy of the phase noise $\Delta PN$, that is, for each i, $K^i.\Delta f$ is equal or greater than $2\Delta PN$. Advantageously, the $K^i$ are all equal since the spectral occupancy of the phase noise $\Delta PN$ is the same for each blocks of reference signals. This enables to ensure that a sufficiently important block of symbols $Y_{n_{min}^i}, \ldots, Y_{n_{max}^i}$ only composed of samples of the reference signals $P^i_1, \ldots, P^i_{K^i}$ is received. For instance, if $K^i$ is greater than or equal to $2\Delta PN/\Delta f$, then $n_{min}$ and $n_{max}$ can be defined as:

if $K^i/2$ is an even integer then $$n_{min}^i = q + \frac{K^i - 4}{4} \text{ and } n_{max}^i = q + \frac{1}{4}(3K^i - 8),$$

if $K^i/2$ is an odd integer then $$n_{min}^i = q + \frac{K^i - 6}{4} \text{ and } n_{max}^i = q + \frac{1}{4}(3K^i - 10),$$

if $(K^i+1)/2$ is an even integer then $$n_{min}^i = q + \frac{K^i - 3}{4} \text{ and } n_{max}^i = q + \frac{1}{4}(3K^i - 5),$$

if $(K^i+1)/2$ an odd integer then $$n_{min}^i = q + \frac{K^i - 5}{4} n_{max}^i = q + \frac{1}{4}(3K^i - 7).$$

In this case, for each i, $Y_{n_{min}^i}, \ldots, Y_{n_{max}^i}$ are:

$$\begin{cases} Y_{n_{min}^i} &= \psi_{k_{min}} X_{q^i+K_0^i-1} H_{q^i+K_0^i-1} + \ldots + \psi_j X_{q^i+k_{max}-j} H_{q^i+k_{max}-j} + \ldots + \psi_{k_{max}} X_{q^i} H_{q^i} Z_{n_{min}^i} \\ \vdots & \quad \vdots \\ Y_n &= \psi_{k_{min}} X_{q^i+K_0^i-1+n-n_{min}^i} H_{q^i+K_0^i-1+n-n_{min}^i} + \ldots + \psi_j X_{q^i+k_{max}-j+n-n_{min}^i} H_{q^i+k_{max}-j+n-n_{min}^i} + \ldots \\ \ldots & + \psi_{k_{max}} X_{q^i+n-n_{min}^i} H_{q^i+n-n_{min}^i} + Z_n \\ \vdots & \quad \vdots \\ Y_{n_{max}^i} &= \psi_{k_{min}} X_{q^i+2K_0^i-2} H_{q^i+2K_0^i-2} + \ldots + \psi_j X_{q^i+k_{max}-j+K_0^i} H_{q^i+k_{max}-j+K_0^i} + \\ \ldots & + \psi_{k_{max}} X_{q^i+K_0^i-1} H_{q^i+K_0^i-1} Z_{n_{max}^i} \end{cases}$$

Where $X_j$ is the symbol emitted on the subcarrier $S_j$ and $(Z_{n_{min}^i}, \ldots, Z_{n_{max}^i})$ represents in the frequency domain additive white Gaussian noise (AWGN). Therefore, by replacing the values of the reference signals we obtain:

$$\begin{cases} Y_{n_{min}^i} &= \psi_{k_{min}} Q^i_{K_0^i} H_{q^i+K_0^i-1} + \ldots + \psi_j Q^i_{k_{max}-j+1} H_{q^i+k_{max}-j} + \ldots + \psi_{k_{max}} Q^i_1 H_{q^i} + Z_{n_{min}^i} \\ \vdots & \quad \vdots \\ Y_n &= \psi_{k_{min}} Q^i_{\langle K_0^i+n-n_{min}^i \rangle_{K_0^i}} H_{q^i+K_0^i-1+n-n_{min}^i} + \ldots + \psi_j Q^i_{\langle k_{max}-j+1+n-n_{min}^i \rangle_{K_0^i}} H_{q^i+k_{max}-j+n-n_{min}^i} + \ldots \\ \ldots & + \psi_{k_{max}} Q^i_{\langle 1+n-n_{min}^i \rangle_{K_0^i}} H_{q^i+n-n_{min}^i} + Z_n \\ \vdots & \quad \vdots \\ Y_{n_{max}^i} &= \psi_{k_{min}} Q^i_{K_0^i-1} H_{q^i+2K_0^i-2} + \ldots + \psi_j Q^i_{k_{max}-j} H_{q^i+k_{max}-j+K_0^i} + \ldots + \psi_{k_{max}} Q^i_{K_0^i} H_{q^i+K_0^i-1} + Z_{n_{max}^i} \end{cases}$$

To simplify we assume that H is constant on the bandwidth corresponding to subcarriers $S_{q^i}$ to $S_{q^i+2K_0^i-2}$, which are the subcarriers transmitting reference signals $P^i_1, \ldots, P^i_{K^i}$. In case of millimeter-Wave systems this assumption is generally not restrictive.

Therefore, $$\begin{cases} Y_{n^i_{min}} &= H^i\left(\psi_{k_{min}}Q^i_{K^i_0} + \ldots + \psi_j Q^i_{k_{max}-j+1} + \ldots + \psi_{k_{max}}Q^i_1\right) + Z_{n^i_{min}} \\ \vdots & \vdots \quad \vdots \\ Y_n &= H^i\left(\psi_{k_{min}}Q^i_{\langle K^i_0+n-n^i_{min}\rangle_{K^i_0}} + \ldots + \psi_j Q^i_{\langle k_{max}-j+1+n-n^i_{min}\rangle_{K^i_0}} + \ldots + \psi_{k_{max}}Q^i_{\langle 1+n-n^i_{min}\rangle_{K^i_0}}\right) + Z_n \\ \vdots & \vdots \quad \vdots \\ Y_{n^i_{max}} &= H^i\left(\psi_{k_{min}}Q^i_{K^i_0-1} + \ldots + \psi_j Q^i_{k_{max}-j} + \ldots + \psi_{k_{max}}Q^i_{K^i_0}\right) + Z_{n^i_{max}} \end{cases}$$

As mentioned above, $K^i$ may be set greater than or equal to $2\Delta PN/\Delta f$ and H may be assumed as constant on the bandwidth corresponding to subcarriers $S_{q^i}$ to $S_{q^i+2K^1_0-2}$. However, in the case H is not constant and/or $2\Delta PN$ is greater than $K^i\Delta f$ then the invention may still be applied with good results but less accurate than when those conditions are met.

Once these $Y_{n_{min}^i}, \ldots, Y_{n_{max}^i}$ are extracted, the channel and phase noise estimation module 4.5 computes channel estimation and a phase noise estimation.

Two different algorithms using the specificities of the specific RS pattern may be implemented by the channel and phase noise estimation module 4.5.

In the first algorithm, the channel and phase noise estimation module 4.5 computes the linear estimation of $F_{K_0^i}^{-1}\{(P_1^i, \ldots, P_{K_0^i}^i)\}$ by $F_{K_0^i}^{-1}\{(Y_{n_{min}^i}, \ldots, Y_{n_{max}^i})\}$ with $F_{K_0^i}^{-1}\{U\}$ the inverse DFT of order $K_0^i$ of the vector U of size $K_0^i$, with $$K_0^i = \frac{K^i + 1}{2}$$

if $K^i$ is an odd integer and $$K_0^i = \frac{K^i}{2}$$

if $K^i$ is an even integer, to obtain the vector $(\lambda_1^i, \ldots, \lambda_{K_0^i}^i)$. The linear estimation may be:

a zero-forcing-like estimation:

$$\hat{H}^i \cdot F_{K_0^i}^{-1}\{(\widetilde{\psi_{k_{min}}}, \ldots, \widetilde{\psi_{k_{max}}})\} = F_{K_0^i}^{-1}\{(Y_{n_{min}^i}, \ldots, Y_{n_{max}^i})\} \odot \frac{1}{F_{K_0^i}^{-1}\{(P_1, \ldots, P_{K_0^i})\}};$$

MMSE-like estimation:

$\hat{H}^i \cdot F_{K_0^i}^{-1}\{(\widetilde{\psi_{k_{min}}}, \ldots, \widetilde{\psi_{k_{max}}})\} = (F_{K_0^i}^{-1}\{P_1, \ldots, P_{K_0^i}\})^\dagger F_{K_0^i}^{-1}\{(P_1, \ldots, P_{K_0^i})\} + V)^{-1} F_{K_0^i}^{-1}\{(P_1, \ldots, P_{K_0^i})\}^\dagger F_{K_0^i}^{-1}\{(Y_{n_{min}^i}, \ldots, Y_{n_{max}^i})\}$ with $V^i$ the covariance matrix of size $K_0^i$ of vector $F_{K_0^i}^{-1}\{(Z_{n_{min}^i}, \ldots, Z_{n_{max}^i})\}$ and $\dagger$ is the conjugate transpose operator.

The channel and phase noise estimation module 4.5 computes the frequency domain representation $\hat{H}$ of the channel estimation such as $\hat{H}$ is equal to $\hat{H}^i = F_{K_0^i, M_0}\{(\lambda_1^i, \ldots, \lambda_{K_0^i}^i)\}$ (with $$M_0 = \frac{M}{2} + 1$$

if M is an even integer and $$M_0 = \frac{M + 1}{2}$$

if M is an odd integer) on the bandwidth corresponding to subcarriers $S_{q^i}$ to $S_{q^i+2K_0^i-2}$. Indeed, the central component of the phase noise is the most powerful component, therefore, this central component, component $M_0$, is less impacted by the additive noise, which therefore can be assumed as negligible.

The channel and phase noise estimation module 4.5 computes a group of parameters $(\Lambda_1^i, \ldots, \Lambda_{K_{min}}^i, \ldots, \Lambda_M^i)$, with $\Lambda_j^i = F_{K_0^i, j}\{(\lambda_1^i, \ldots, \lambda_{K_0^i}^i)\}$ for j from $k_{min}$ to $k_{max}$ and zero otherwise, with $F_{K_0^i, j}\{u\}$ is the j-th terme of DFT of order $K_0^i$ of the vector u of size $K_0^i$. Then the frequency domain representation $\hat{\psi}$ of the phase noise estimation, $\hat{\psi} = (\hat{\psi}_1, \ldots, \hat{\psi}_M)$, can be computed based on the group of parameters $(\Lambda_1^i, \ldots, \Lambda_{K_{min}}^i, \ldots, \Lambda_{k_{max}}^i, \ldots, \Lambda_M^i)$. For example, $\hat{\psi}_j = e^{-i \cdot \arg \hat{H}^i} \Lambda_j^i$. In another example, each $\hat{\psi}_j$ can be computed based on an coherent average of the parameters through the RS pattern, that is, for example, $$\hat{\psi}_j = \frac{1}{L}\sum_{i=1}^{L} e^{-i \cdot \arg \hat{H}^i} \Lambda_j^i.$$

This enables to enhance the accuracy of the phase noise estimation. Multiplying $\Lambda_j^i$ by $e^{-i \cdot \arg \hat{H}^i}$ compute phase noise component $\hat{\psi}_j$ for which the phase does not depend on the channel estimation.

In the second algorithm, when the $P^i_1, \ldots, P^i_{K^i}$ are issued from a sequence of $Q^i_1, \ldots, Q^i_{K_0^i}$ which satisfies the auto-correlation condition (for example a Zadoff-Chu sequences), channel and phase noise estimation module 4.5 computes the frequency domain representation $\hat{H}$ of the channel estimation such as $\hat{H}$ is computed based on $$\frac{1}{K_0^i}\sum_{n=n_{min}^1}^{n_{max}^i} Y_n \cdot \overline{Q^i_{\langle n-q^i+2-M_0\rangle_{K_0^i}}}$$

with $$K_0^i = \frac{K^i + 1}{2}$$

if $K^i$ is an odd integer and $$K_0^i = \frac{K^i}{2}$$

if $K^i$ is an even integer.

For example, $\hat{H}$ is equal to $$\hat{H}^i = \frac{1}{A^i K_0^i} \sum_{n=n_{min}^i}^{n_{max}^i} Y_n \cdot \overline{Q^i_{\langle n-q^i+2-M_0 \rangle_{K_0^i}}}$$

on the bandwidth corresponding to subcarriers $S_{q^i}$ to $S_{q^i+2K_0^i-2}$, with $$A^i = \frac{1}{K_0^i} \sum_{n=1}^{K_0^i} Q_n^i \overline{Q^i_{\langle n \rangle_{K_0^i}}}.$$

The channel and phase noise estimation module 4.5 computes a group of parameters $(\Lambda_1^i, \ldots, \Lambda_{k_{min}^i}^i, \ldots, \Lambda_{k_{max}^i}^i, \ldots \Lambda_M^i)$ with $$\Lambda_j^i = \frac{1}{A^i K_0^i} \sum_{n=n_{min}^i}^{n_{max}^i} Y_n \cdot \overline{Q^i_{\langle n-q^i+2-j \rangle_{K_0^i}}}.$$

Then the frequency domain representation $\hat{\psi}$ of the phase noise estimation, $\hat{\psi}=(\hat{\psi}_1, \ldots, \hat{\psi}_M)$, can be computed based on the group of parameters $(\Lambda_1^i, \ldots, \Lambda_{k_{min}^i}^i, \ldots, \Lambda_{k_{max}^i}^i, \ldots \Lambda_M^i)$. For example, $\hat{\psi}_{(j-M_*)_M} = e^{-i.arg \hat{H}_M^i} \Lambda_j^i$ for $K_{min}^i \leq j \leq k_{max}^i$, with $$M_* = \frac{M}{2}$$

if M is an even integer and $$M_* = \frac{M-1}{2}$$

if M is an odd integer, with $$k_{min}^i = M_0 - \frac{K^i - 4}{4} \text{ and } k_{max}^i = M_0 + \frac{K^i}{4}$$

if $K^i$ is an even integer and $K^i/2$ is an even integer, $$k_{min}^i = M_0 - \frac{K^i - 2}{4} \text{ and } k_{max}^i = M_0 + \frac{K^i - 2}{4}$$

if $K^i$ is an even integer and $K^i/2$ is an odd integer, $$k_{min}^i = M_0 - \frac{K^i - 3}{4} \text{ and } k_{max}^i = M_0 + \frac{K^i + 1}{4}$$

if $K^i$ is an odd integer and $K^i/2$ is an even integer, $$k_{min}^i = M_0 - \frac{K^i - 1}{4} \text{ and } k_{max}^i = M_0 + \frac{K^i - 1}{4}$$

if $K^i$ is an odd integer and $K^i/2$ is an odd integer. In another example, each $\hat{\psi}_{(j-M_*)_M}$ can be computed based on an average of the parameters through the RS pattern, that is, for example, $$\hat{\psi}_{(j-M_*)_M} = \frac{1}{L} \sum_{i=1}^{L} e^{-i.arg \hat{H}^i} \Lambda_j^i,$$

for $k_{min}^i \leq j \leq k_{max}^i$. This enables to enhance the accuracy of the phase noise estimation.

Once the channel and phase noise estimation are computed by the channel and phase noise estimation module 4.5, either by the first or the second algorithm, the equalization module 4.6 performs a linear equalization based on $\hat{H}$ of R, R being a DFT of order M of $e^{-i\varphi} \odot y$ with $e^{-i\varphi}$ equal to $$\left( \frac{F_{M,1}^{-1}\{\hat{\psi}\}}{|F_{M,1}^{-1}\{\hat{\psi}\}|}, \ldots, \frac{F_{M,M}^{-1}\{\hat{\psi}\}}{|F_{M,M}^{-1}\{\hat{\psi}\}|} \right),$$

with $F_{M,m}^{-1}\{U\}$ being the m-th terme of the inverse DFT of order M of U and with y being the time domain signal received by the receiver. $A \odot B$ is the Hadamard product. For example, $R=F_M\{e^{-i\varphi}\} \circledast (Y_1, \ldots, Y_M)$, with $F_M\{u\}$ the DFT of order M of the vector u of size M and a linear equalization based on $\hat{H}$ of R is performed. From such linear equalization results estimated symbols $(\hat{X}_1, \ldots, \hat{X}_M)=\hat{X}$ of the symbols $X_1, \ldots, X_M$ respectively transmitted through the subcarriers $S_1, \ldots, S_M$. For example, estimated symbols $(\hat{X}_1, \ldots, \hat{X}_M)$ may be obtained by a minimum mean-squared error (MMSE) equalization, that is:

$$\hat{X}=WR$$

Where W is a diagonal matrix $$\begin{pmatrix} W^1 & 0 & 0 \\ 0 & \ddots & 0 \\ 0 & 0 & W^L \end{pmatrix} \text{ with } W^i = \frac{\overline{\hat{H}^i}}{|\hat{H}^i|^2 + \sigma^2},$$

with $\sigma^2$ is the variance of the additive white Gaussian noise measured at the channel output.

It is then applied to the result of the linear equalization a subcarrier demapping module 4.7 and a parallel to serial module 4.8 at the output of which the N symbols emitted, including the N' symbols, are retrieved.

Figure 5:
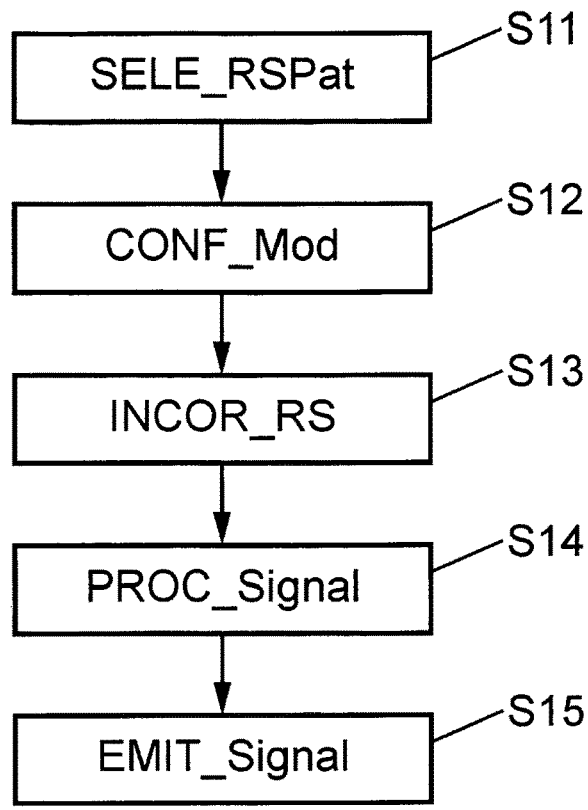
FIG. 5 illustrates a flowchart representing the steps of radio signal processing according to the invention.

Referring to FIG. 5 there is shown a flowchart representing the steps of radio signal processing according to the invention.

At step S11 a RS pattern stored in the memory unit 1.5 is selected. The selection may be either static or dynamically. When the RS pattern is dynamically selected, the transmitter 1.1 may change, for example for each OFDM symbol or for a number of OFDM symbols, the RS pattern used for the insertion of RS. This selection may be done according to feedbacks from the receiver 1.2 through a control channel. In the case of a dynamic selection of the RS pattern the transmitter may choose another configuration upon those saved in the MEMO_trans 1.5. Indeed, several configurations may be stored in the MEMO_trans 1.5, those configurations can be ordered according to the number of reference signals ($\Sigma K^i$) and/or the number of groups of RS the RS pattern provides. A RS pattern may be defined by the number $\Sigma K^i$ of reference signals, by the number of groups (L) of RS or by the positions of the RS in the frequency domain.

The transmitter 1.1 may select a RS pattern based on the communication configuration (subcarrier spacing configuration, carrier frequency range, modulation and coding scheme, carrier frequency, resource allocation unit) and radio channel characteristics (strong phase noise variation, strong sensitivity to the frequency) of the transmission.

At step S12 the subcarrier mapping module 2.2 and the RS insertion module 2.3 are configured according to the RS pattern stored in the memory unit 1.5 and used for the transmission. Therefore, the subcarrier mapping module 2.2 is configured to map the N' symbols at its inputs on subcarriers that will not be occupied, according to the RS pattern, by the $\Sigma K^i$ reference signals.

At step S13 the RS insertion module 2.3, inserts the reference signals on positions defined by the RS pattern, that is, on the subcarriers $\cup_{i=1}^{L}\{S_{qi+1}, \ldots, S_{qi+K^i}\}$ as previously described. The other subcarriers are occupied by the N' symbols to be transmitted and by zeros according to the scheme of the subcarrier mapping.

At step S14 the signal is processed, that is on the M symbols $X=(X_1, \ldots X_M)$ is applied an OFDM scheme (IDFT module 2.4, CP module 2.5 and DAC module 2.6).

At step S15 the signal is emitted by Tx 2.0.

Figure 6:
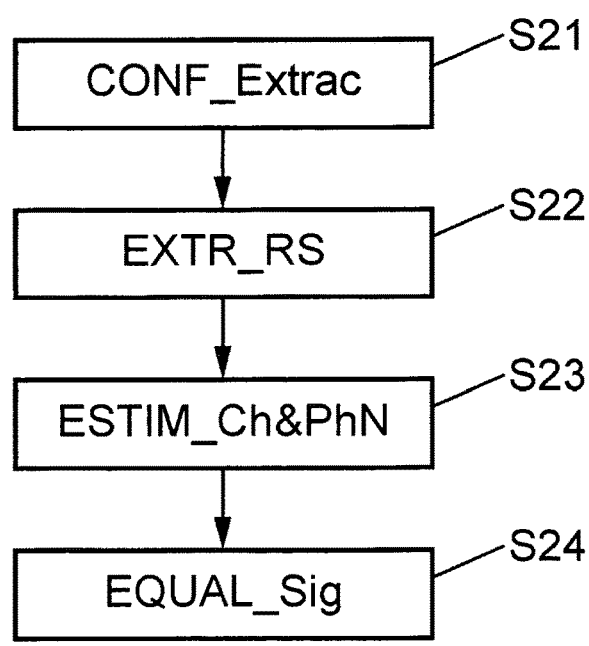
FIG. 6 illustrates a flowchart representing the steps of radio signal decoding according to the invention.

Referring to FIG. 6 there is shown a flowchart representing the steps of radio signal decoding according to the invention.

At step S21 the RS extractor module 4.4, the channel and phase noise estimation module 4.5 and the equalization module 4.6 are configured according to the configuration of the RS insertion module 2.3. For this purpose the receiver 1.2 may receive, for example from the transmitter 1.1, the RS pattern used for the transmission. The same RS pattern stored in the MEMO_trans 1.5 may be stored in the MEMO_recei 1.8. The transmitter 1.1 can optionally send control information to the receiver 1.2 through a control channel, this control information pointing the RS pattern selected for the transmission.

At step. S22 the RS extraction module 4.4 extracts parts of the symbols $Y_1, \ldots, Y_M$ outputted by the DFT module 4.3. More specifically, the RS extraction module 4.4 extracts the symbols $\cup_{i=1}^{L}\{Y_{n_{min}^i}, \ldots, Y_{n_{max}^i}\}$.

At step S23 channel estimation and phase noise estimation is performed based on the symbols extracted as previously described.

At step S24 the symbols $Y_1, \ldots, Y_M$ outputted by the DFT module 4.3 are processed by the equalization module 4.6 to obtain the estimated symbols $(\hat{X}_1, \ldots, \hat{X}_M)=\hat{X}$ of the symbols $X_1, \ldots, X_M$ respectively transmitted through the subcarriers $S_1, \ldots, S_M$. This is done according to the channel estimation and to the phase noise estimation computed by the channel and phase noise estimation module 4.5 as previously described. The estimated symbols $(\hat{X}_1, \ldots, \hat{X}_M)$ are then processed through the subcarrier demapping module 4.7 and the parallel to serial module 4.8 to retrieve the N' symbols previous processed by the transmitter 1.1.

The invention claimed is:

1. A method for transmitting at least K reference signals in a radio signal to be transmitted over a wireless communication system, said radio signal being intended to be emitted by an emitter comprising at least a transmit antenna configured for emitting on a number M of subcarriers $S_1, \ldots, S_M$ amongst which at least a number K of different subcarriers $S_{q+1}, S_{q+2}, \ldots, S_{q+K}$ are contiguous, respective frequencies of contiguous subcarriers $S_{q+1}, S_{q+2}, \ldots, S_{q+K}$ being ordered, said radio signal being provided by:

inserting the at least K reference signals $P_1, \ldots, P_K$ to respectively transmit the at least K reference signals $P_1, P_K$ on the K contiguous subcarriers $S_{q+1}, S_{q+2}, \ldots, S_{q+K}$;

emitting the radio signal including the at least K reference signals;

wherein q is an integer greater than or equal to zero; and wherein, if K is odd, values in frequency domain of the reference signals $P_1, \ldots, P_{(K-1)/2}$ are respectively equal to values of the reference signals $P_{(K+3)/2}, \ldots, P_K$, if K is even, values in the frequency domain of the reference signals $P_1, \ldots, P_{K/2}$ are respectively equal to values of the reference signals $P_{K/2+1}, \ldots, P_K$.

2. The method according to claim 1, wherein, if K is odd the values of $P_1, \ldots, P_{(K+1)/2}$ are respectively a sequence $Q_1, \ldots Q_{(K+1)2}$ such as $$\frac{2}{K+1}\sum_{k=1}^{\frac{K+1}{2}} Q_k \overline{Q_{(k-J+1)_{\frac{K+1}{2}}}}$$

is equal to a non-null predetermined value if j is equal to 1 and equal to zero otherwise, with $(n)_L$ being $1+\mathrm{mod}(n-1, L)$, with $\mathrm{mod}(n-1, L)$ being $[n-1] \bmod L$, and if K is even the values of $P_1, \ldots, P_{K/2}$ are respectively a sequence $Q_1, \ldots Q_{K/2}$ such as $$\frac{2}{K}\sum_{k=1}^{\frac{K}{2}} Q_k \overline{Q_{(k-J+1)_{\frac{K}{2}}}}$$

is equal to a non-null predetermined value if j is equal to 1 and equal to zero otherwise.

3. The method according to claim 1, wherein at least K+K' reference signals are transmitted on the M subcarriers $S_1, \ldots, S_M$ amongst which at least a number K' of different subcarriers $S_{q'+1}, S_{q'+2}, \ldots, S_{q'+K'}$ are contiguous, the respective frequencies of the contiguous subcarriers $S_{q'+1}, S_{q'+2}, \ldots, S_{q+K}$ being ordered and q' strictly superior than q+K, said radio signal being further provided by:

inserting the at least K' reference signals $P'_1, \ldots P'_{K'}$ so that the at least K' reference signals $P'_1, \ldots P'_{K'}$ are respectively transmitted on the K' contiguous subcarriers $S_{q'+1}, S_{q'+2}, \ldots, S_{q'+K'}$;

emitting the radio signal including the at least K+K' reference signals;

wherein, if K' is odd, the values in the frequency domain of the reference signals $P'_1, \ldots, P'_{(K-1)/2}$ are respectively equal to the values of the reference signals $P'_{(K'+3)/2}, \ldots, P'_{K'}$, if K' is even, the values in the frequency domain of the reference signals $P'_1, \ldots, P'_{K'/2}$ are respectively equal to the values of the reference signals $P'_{K'/2+1}, \ldots, P'_{K'}$.

4. The method according to claim 1, wherein K is set such as $K \cdot \Delta f$ is greater or equal than $2 \cdot \Delta PN$, with $\Delta f$ being the subcarrier spacing of at least the subcarriers $S_{q+1}$, $S_{q+2}, \ldots, S_{q+K}$ and $\Delta PN$ is the spectral occupancy of a phase noise of which suffer the radio signal.

5. The method for processing at a receiver the radio signal transmitted over the wireless communication system and received from the emitter comprising at least the transmit antenna configured for emitting on the number M of different subcarriers $S_1, \ldots, S_M$ amongst which at least the number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+K}$ being ordered, said radio signal including the at least K reference signals, said radio signal being provided according to claim 1, said method comprising:
    determining a channel estimation, said channel estimation being dependent on a phase noise estimation;
    processing the radio signal using the channel estimation determined.

6. The method according to claim 5, wherein the determination of the channel estimation comprises:
    determining symbols $Y_{n_{min}}, \ldots, Y_{n_{max}}$, said symbols $Y_{n_{min}}, \ldots, Y_{n_{max}}$ frequency domain being respectively received on subcarriers $S_{n_{min}}, \ldots, S_{n_{max}}$, with:
    in the frequency
    if K/2 is an even integer then $$n_{min} = q + \frac{K-4}{4} \text{ and } n_{max} = q + \frac{1}{4}(3K-8),$$

if K/2 is an odd integer then $$n_{min} = q + \frac{K-6}{4} \text{ and } n_{max} = q + \frac{1}{4}(3K-10),$$

if (K+1)/2 is an even integer then $$n_{min} = q + \frac{K-3}{4} \text{ and } n_{max} = q + \frac{1}{4}(3K-5),$$

if (K+1)/2 is an odd integer then $$n_{min} = q + \frac{K-5}{4} \text{ and } n_{max} = q + \frac{1}{4}(3K-7);$$

computing the channel estimation, said channel estimation being obtained through a linear estimation based on $F_{K_0}^{-1}\{(P_1, \ldots, P_{K_0})\}$ and $F_{K_0}^{-1}\{(Y_{n_{min}}, \ldots, Y_{n_{max}})\}$, with $F_{K_0}^{-1}\{U\}$ being the inverse DFT of order $K_0$ of the vector U of size $K_0$, with $$K_0 = \frac{K+1}{2}$$

if K is an odd integer and $$K_0 = \frac{K}{2}$$

if K is an even integer.

7. The method according to claim 6, wherein the determination of the channel estimation further comprises:
    computing a frequency domain representation $\hat{H}$ of the channel estimation, such as $\hat{H}$ is computed based on $$F_{K_0, M_0}\{(\lambda_1, \ldots, \lambda_{K_0})\}$$

where $(\lambda_1, \ldots, \lambda_{K_0})$ is the result of the linear estimation based on $F_{K_0}^{-1}\{(P_1, \ldots, P_{K_0})\}$ and $F_{K_0}^{-1}\{(Y_{n_{min}}, \ldots, Y_{n_{max}})\}$, and $F_{K_0,j}\{u\}$ is the j-th terme of DFT of order $K_0$ of the vector u of size $K_0$ and with $$M_0 = \frac{M}{2} + 1$$

if M is an even integer and $$M_0 = \frac{M+1}{2}$$

if M is an odd integer.

8. The method according to claim 6, further comprises:
    computing a frequency domain representation $\hat{\psi}$ of the phase noise estimation, $\hat{\psi} = (\hat{\psi}_1, \ldots, \hat{\psi}_M)$ such that $\hat{\psi}_{(j-M_*)_M}$, $$M_* = \frac{M}{2}$$

if M is an even integer and $$M_* = \frac{M-1}{2}$$

if M is an odd integer, is computed based on $$F_{K_0, M_0}\{(\lambda_1, \ldots, \lambda_{K_0})\}$$

where $(\lambda_1, \ldots, \lambda_{K_0})$ is the result of the linear estimation based on $F_{K_0}^{-1}\{(P_1, \ldots, P_{K_0})\}$ and $F_{K_0}^{-1}\{(Y_{n_{min}}, \ldots, Y_{n_{max}})\}$, and $F_{K_0,j}\{u\}$ is the j-th terme of DFT of order $K_0$ of the vector u of size $K_0$.

9. The method according to claim 8, wherein the processing of the radio signal comprises:
    computing estimated symbols $\hat{X}_1, \ldots, \hat{X}_M$ of symbols $X_1, \ldots, X_M$ respectively transmitted on the subcarriers $S_1, \ldots, S_M$, said estimated symbols $(\hat{X}_1, \ldots, \hat{X}_M)$ being obtained by linear equalization based on $\hat{H}$ of R, R being a DFT of order M of $e^{-i\hat{\varphi}} \odot y$ with $e^{-i\hat{\varphi}}$ equal to $$\left( \frac{F_{M,1}^{-1}\{\hat{\psi}\}}{|F_{M,1}^{-1}\{\hat{\psi}\}|}, \ldots, \frac{F_{M,M}^{-1}\{\hat{\psi}\}}{|F_{M,M}^{-1}\{\hat{\psi}\}|} \right),$$

with $F_{M,m}^{-1}\{U\}$ all being the m-th terme of the inverse DFT of order M of U and with y being the time domain signal received by the receiver.

10. The method according to claim 5,
    wherein, if K is odd the values of $P_1, \ldots, P_{(K+1)/2}$ are respectively a sequence $Q_1, \ldots Q_{(K+1)/2}$ such as $$\frac{2}{K+1}\sum_{k=1}^{\frac{K+1}{2}} Q_k \overline{Q_{\langle k-J+1\rangle_{\frac{K+1}{2}}}}$$

is equal to a non-null predetermined value if j is equal to 1 and equal to zero otherwise, with $(n)_L$ being $1+\text{mod}(n-1, L)$, with $\text{mod}(n-1, L)$ being $[n-1] \mod L$, and if K is even the values of $P_1, \ldots, P_{K/2}$ are respectively a sequence $Q_1, \ldots Q_{K/2}$ such as $$\frac{2}{K}\sum_{k=1}^{\frac{K}{2}} Q_k \overline{Q_{\langle k-J+1\rangle_{\frac{K}{2}}}}$$

is equal to a non-null predetermined value if j is equal to 1 and equal to zero otherwise, and wherein the determination of the channel estimation comprises:

determining symbols $Y_{n_{min}}, \ldots, Y_{n_{max}}$, said symbols $Y_{n_{min}}, \ldots, Y_{n_{max}}$ in the frequency domain being respectively received on subcarriers $S_{n_{min}}, \ldots, S_{n_{max}}$, with:

if K/2 is an even integer then $$n_{min} = q + \frac{K-4}{4} \text{ and } n_{max} = q + \frac{1}{4}(3K-8),$$

if K/2 is an odd integer then $$n_{min} = q + \frac{K-6}{4} \text{ and } n_{max} = q + \frac{1}{4}(3K-10),$$

if (K+1)/2 is an even integer $$n_{min} = q + \frac{K-3}{4} \text{ and } n_{max} = q + \frac{1}{4}(3K-5),$$

if (K+1)/2 is an odd integer then $$n_{min} = q + \frac{K-5}{4} \text{ and } n_{max} = q + \frac{1}{4}(3K-7);$$

computing a frequency domain representation $\hat{H}$ of the channel estimation, such as $\hat{H}$ is computed based on $$\frac{1}{K_0}\sum_{n=n_{min}}^{n_{max}} Y_n \cdot \overline{Q_{\langle n-q+2-M_0\rangle_{K_0}}}$$

with if $$K_0 = \frac{K+1}{2}$$

K is an odd integer and $$K_0 = \frac{K}{2}$$

if K is an even integer and with $$M_0 = \frac{M}{2} + 1$$

if M is an even integer and $$M_0 = \frac{M+1}{2}$$

if M is an odd integer;

processing the radio signal using the channel estimation computed.

11. The method according to claim 10, further comprises:

computing a frequency domain representation $\hat{\psi}$ of the phase noise estimation, $\hat{\psi}=(\hat{\psi}_1, \ldots, \hat{\psi}_M)$ such that $$\hat{\psi}_{\langle j-M_*\rangle_M}, M_* = \frac{M}{2}$$

if M is an even integer and $$M_* = \frac{M-1}{2}$$

if M is an odd integer, is computed, for $k_{min} \leq j \leq k_{max}$, based on:

$$\frac{1}{K_0}\sum_{n=n_{min}}^{n_{max}} Y_n \cdot \overline{Q_{\langle n-q+2-j\rangle_{K_0}}}$$

with $$k_{min} = M_0 - \frac{K-4}{4} \text{ and } k_{max} = M_0 + \frac{K}{4}$$

if K is an even integer and K/2 is an even integer, $$k_{min} = M_0 - \frac{K-2}{4} \text{ and } k_{max} = M_0 + \frac{K-2}{4}$$

if K is an even integer and K/2 is an odd integer, $$k_{min} = M_0 - \frac{K-3}{4} \text{ and } k_{max} = M_0 + \frac{K+1}{4}$$

if K is an odd integer and K/2 is an even integer, $$k_{min} = M_0 - \frac{K-1}{4} \text{ and } k_{max} = M_0 + \frac{K-1}{4}$$

if K is an odd integer and K/2 is an odd integer, and
processing the radio signal using the phase noise estimation $\hat{\psi}$ computed.

12. An emitter for transmitting at least K reference signals in a radio signal to be transmitted over a wireless communication system, said radio signal being intended to be emitted by the emitter, said emitter comprising:
at least a transmit antenna configured for emitting on a number M of subcarriers $S_1, \ldots, S_M$ amongst which at least a number K of different subcarriers $S_{q+1}, S_{q+2}, \ldots, S_{q+K}$ are contiguous, respective frequencies of contiguous subcarriers $S_{q+1}, S_{q+2}, \ldots, S_{q+K}$ being ordered,
a processor; and
a non-transitory computer-readable medium comprising instructions stored thereon, which when executed by the processor configure the emitter to:
insert the at least K reference signals $P_1, \ldots P_K$ to respectively transmit the at least K reference signals $P_1, \ldots P_K$ on the K contiguous subcarriers $S_{q+1}, S_{q+2}, \ldots, S_{q+K}$;
emit the radio signal including the at least K reference signals;
wherein q is an integer greater than or equal to zero; and
wherein, if K is odd, values in frequency domain of the reference signals $P_1, \ldots, P_{(K-1)/2}$ are respectively equal to values of the reference signals $P_{(K+3)/2}, \ldots, P_K$, if K is even, values in the frequency domain of the reference signals $P_1, \ldots, P_{K/2}$ are respectively equal to values of the reference signals $P_{K/2+1}, \ldots, P_K$.

13. A receiver for processing a radio signal transmitted over a wireless communication system and received from an emitter comprising at least a transmit antenna configured for emitting on a number M of different subcarriers $S_1, \ldots, S_M$ amongst which at least a number K of different subcarriers $S_{q+1}, S_{q+2}, \ldots, S_{q+K}$ are contiguous, the respective frequencies of the contiguous subcarriers $S_{q+1}, S_{q+2}, \ldots, S_{q+k}$ being ordered, said radio signal including K reference signals, said radio signal being provided by:
inserting the at least K reference signals $P_1, \ldots, P_K$ to respectively transmit the at least K reference signals $P_1, \ldots P_K$ on the K contiguous subcarriers $S_{q+1}, S_{q+2}, \ldots, S_{q+K}$;
emitting the radio signal including the at least K reference signals;
wherein g is an integer greater than or equal to zero; and
wherein, if K is odd, values in the frequency domain of the reference signals $P_1, \ldots, P_{(K-1)/2}$ are respectively equal to the values of the reference signals $P_{(K+3)/2}, \ldots, P_K$, if K is even, the values in the frequency domain of the reference signals $P_1, \ldots, P_{K/2}$ are respectively equal to the values of the reference signals $P_{K/2+1}, \ldots, P_K$, said receiver comprising:
at least one receiving antenna;
a processor; and
a non-transitory computer-readable medium comprising instructions stored thereon, which when executed by the processor configure the receiver to:
determine a channel estimation, said channel estimation being dependent on a phase noise estimation;
process the radio signal using the channel estimation determined.

* * * * *